May 8, 1951 A. V. BEDFORD 2,551,785
TELEVISION SYNCHRONIZING APPARATUS
Filed June 24, 1947 2 Sheets-Sheet 1

INVENTOR.
ALDA V. BEDFORD
BY Samuel B. Smith
ATTORNEY

May 8, 1951 A. V. BEDFORD 2,551,785

TELEVISION SYNCHRONIZING APPARATUS

Filed June 24, 1947 2 Sheets-Sheet 2

INVENTOR.
ALDA V. BEDFORD
BY. Samuel B. Smith.
ATTORNEY

Patented May 8, 1951

2,551,785

UNITED STATES PATENT OFFICE 2,551,785

TELEVISION SYNCHRONIZING APPARATUS

Alda V. Bedford, Princeton, N. J., assignor to Radio Corporation of America, a corporation of Delaware Application June 24, 1947, Serial No. 756,670

18 Claims. (Cl. 178—69.5)

Figure 1:
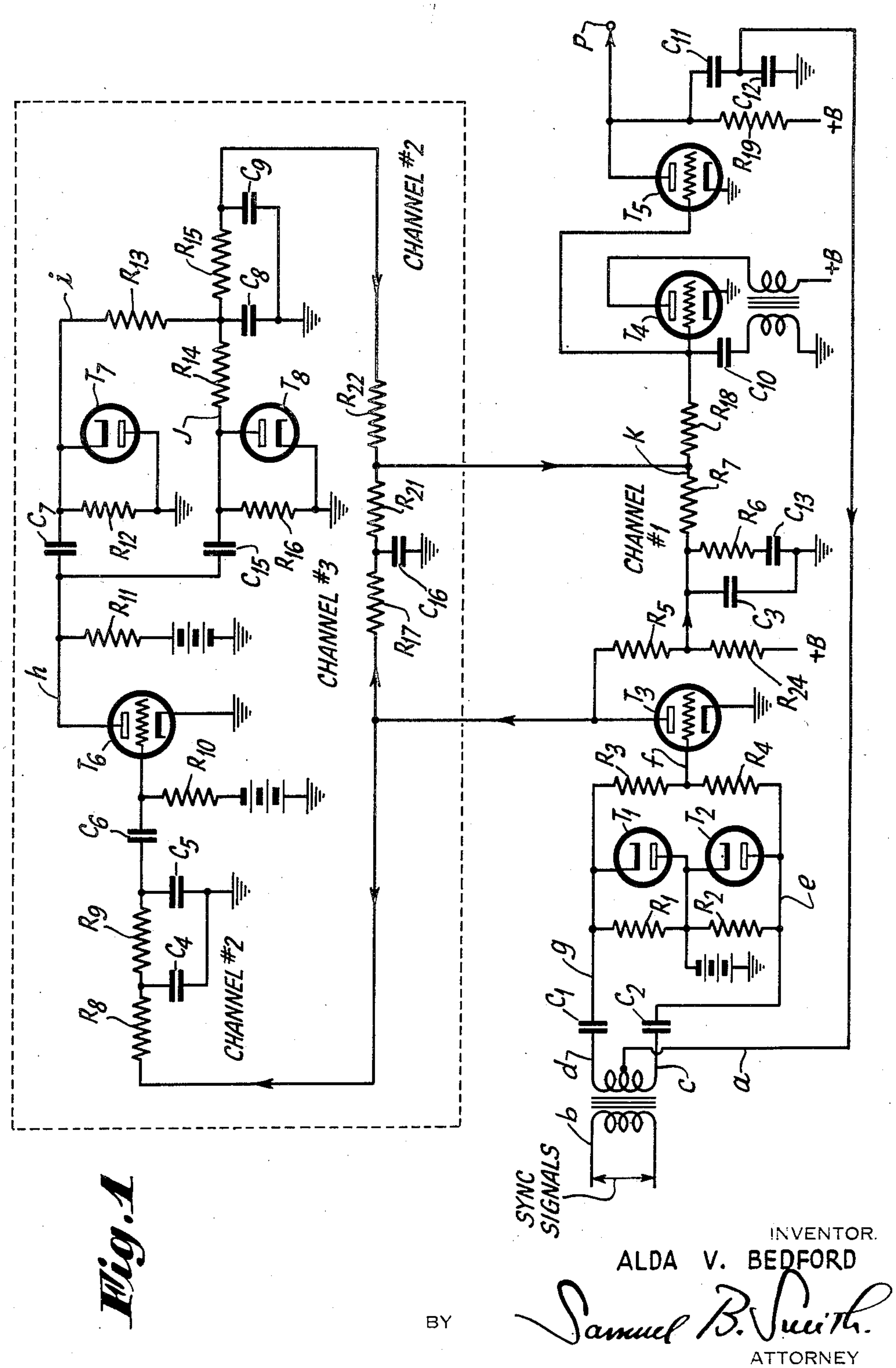

My invention relates, in general, to automatic frequency control circuits and, more particularly, to such circuits as are used in apparatus for synchronizing the operation of a television receiver with a television transmitter.

In the earlier television receivers, synchronization of the movement of a cathode ray beam used at the receiver to reproduce the image being televised with the movement of a cathode ray beam used in scanning apparatus at the transmitter was accomplished by utilizing synchronizing signals developed at the transmitter and received at the receiver to cause triggering of the scanning oscillators at the receiver itself. The natural frequencies of the horizontal and vertical scanning oscillator at the receiver, in the absence of a synchronizing signal, were generally lower than the line or field frequencies at the transmitter. The received synchronizing signal was used to initiate or trigger a new cycle of the scanning oscillator before one would otherwise occur and the period of the horizontal scanning oscillator was shortened to conform to line frequency and the period of the vertical oscillator was shortened to conform to field frequency. It was necessary, therefore, to receive the synchronizing signal in order that triggering of the oscillators be accomplished at the correct time. Momentary absence of the synchronizing signal due to fading or to its being blanketed by spurious signals would lead to the falling out of step of the scanning oscillator at the receiver and thus distortion would occur. Again, pulses, such as noise pulses, would cause the scanning oscillator ofttimes to be triggered ahead of time thus giving an undesired and unpleasant effect in the reproduced image.

To overcome these disadvantages, arrangements were devised which utilize an automatic frequency control apparatus in which the phase of the received synchronizing signals is compared with the phase of the output wave developed by the scanning oscillator and variations from a predetermined correct phase relationship are utilized to provide gradual correction in the frequency of the scanning oscillator itself. This correction is applied until the scanning oscillator is pulled into step or into correct phase relationship with the received synchronizing signals. Synchronizing systems employing automatic frequency control circuits have been shown, for instance, in U. S. Patents Nos. 2,250,284, granted July 22, 1941 to K. R. Wendt; 2,344,810, granted March 21, 1944 to G. L. Fredendall et al; and 2,358,545, granted September 19, 1944 to K. R.

Wendt, and have been further described in an article by Wendt and Fredendall entitled "Synchronization in Television Receivers" and appearing in the January, 1943, edition of the "Proceedings of the Institute of Radio Engineers."

Also, improved circuits of the automatic frequency control type are disclosed by U. S. Patent No. 2,460,112 of A. Wright and E. L. Clark, issued January 25, 1949 entitled "Beam Deflection Control for Cathode Ray Devices," for instance. It is one of the purposes of my invention to provide an improved circuit of the general nature disclosed in the hereinbefore referred to patent to Fredendall et al., and also as set forth in the article in the "Proceedings of the IRE."

In the Fredendall et al. patent disclosure referred to, the received synchronizing signals are impressed onto a pair of peak detectors in unlike polarities and the developed sawtooth wave from the scanning oscillators at the receiver is impressed onto the peak detectors in like polarities. The combined outputs of the peak detectors are passed through filtering apparatus to eliminate the higher frequency components thereof and the output of the filter is impressed onto a direct current amplifying tube, the output of which is used to bias the scanning oscillator. Under the proper relative phase conditions, the output of the direct current amplifier is such as to provide the proper bias to cause the scanning oscillator to run at the correct line or field frequency and in proper phase. A drift from the proper phase leads to a changing of the combined outputs of the peak detectors which, in turn, is amplified by the direct current amplifying tube and the changed bias so developed is used to control and adjust the frequency of the scanning oscillator to bring the oscillator back into correct phase relationship with the incoming synchronizing signals. Under some circumstances, it is desirable that synchronization be restored more quickly than is done by the Fredendall et al. circuit and this is true when the frequency of the scanning oscillator varies considerably from that of the incoming synchronizing signals. It is a further purpose, therefore, of the present invention to provide an improved circuit of the general nature of the Fredendall et. al. circuit in which the scanning oscillator will be pulled into synchronism positively and rapidly.

It is still a further purpose of the present invention to provide a circuit in which an automatic frequency control apparatus is used to control the frequency of the scanning oscillator of a television receiver and which will maintain synchronism to a more positive degree than has heretofore been done between the action of a local scanning oscillator and received synchronizing signals after a definite phase relationship between the received synchronizing signals and the output waves from the scanning oscillator has been obtained.

Another purpose of my invention is to provide a synchronizing circuit to maintain proper synchronization when the synchronizing signal is imperfect because of noise or fading.

Other purposes of the invention will be apparent from a reading of the hereinafter appended specification.

My invention, in general, contemplates the provision of a circuit of the general Fredenall et al. type referred to hereinbefore in combination with additional circuit apparatus as will be set forth more particularly hereinafter in this specification. As in the mentioned Fredenall et al. circuit, there are provided a pair of peak detectors having the synchronizing signals impressed thereon in opposing polarities and a portion of a scanning oscillator output is fed back and impressed onto the peak detectors in like polarities. The output of the peak detectors is passed through a smoothing filtering circuit and the output of the filter is used to bias a thermionic tube included in the scanning oscillator and thus to affect its frequency output. This corresponds to the Fredenall et al. showing.

Additionally, in the preferred embodiment of my invention, there is provided a second smoothing filter onto which is impressed a portion of the unfiltered output of the peak detectors. The output of the second smoothing filter is differentiated and then, after appropriate amplification, is impressed onto a pair of rectifiers which are diodes, or even crystals, and which are connected so that positive excursions of the wave impressed thereon cause a greater output to be developed from one of the rectifiers and a lesser output from the other, and negative excursions of the wave will cause the reverse to be true. The outputs of the rectifiers are combined and the combined waves indicate whether the scanning oscillator is running too fast or too slow. The combined signals are passed through an additional third smoothing filter and the ouput of the latter is then combined with the control signal from the first filter and it is a combination of these two signals which effects a rapid and positive bringing of the scanning oscillator into the desired phase relationship with the incoming synchronizing signals.

A fourth smoothing filter is provided and has a portion of the output from the peak detectors (of the circuit of Fredendall et al.) impressed thereon and the output of this filter is combined with the other two control signals and adds to the control effect on the scanning oscillator. The purpose of the fourth filter is to act as a control channel which produces an output wave having less high frequency components than that of the output of the first filter and is, therefore, relatively free from noise but is sluggish in character and therefore does not help a great deal in obtaining initial lock-in. However, it can and does provide a useful generous bias for the tube contained in the scanning oscillator after lock-in has been obtained through the action of the first and third filters with their associated apparatus and aids in holding the scanning oscillator in a selected relationship with the incoming synchronizing signals after that lock-in or desired relationship has been obtained.

Figure 2:
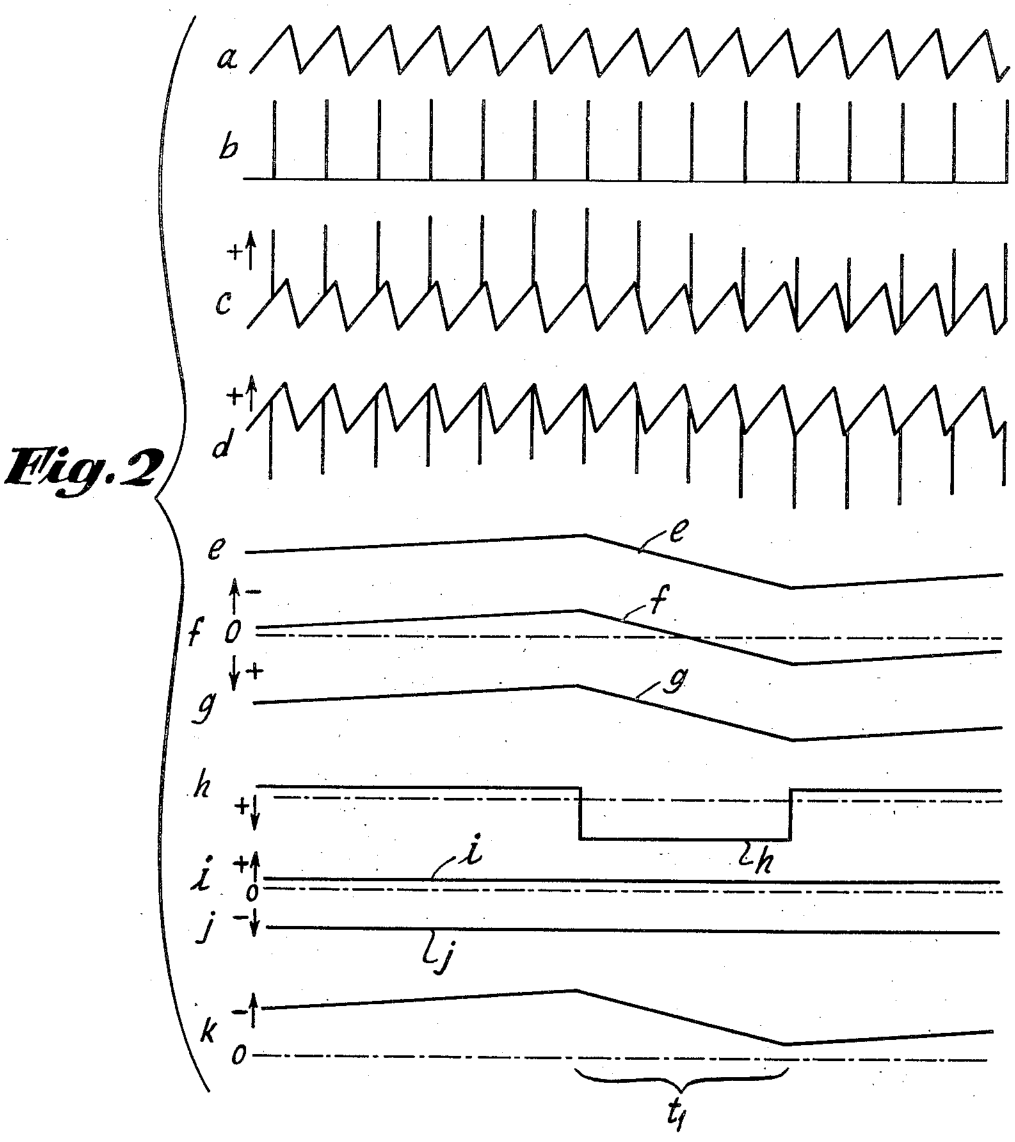

My invention will best be understood by reference to the drawings in which:

Fig. 1 is an embodiment of the invention; and,

Fig. 2, sections *a* through *k* thereof, is a set of explanatory curves.

Referring to Fig. 1, there is shown one embodiment of my invention. In this figure, the portion thereof which includes my additions to the Fredendall et al. invention, whose operation is described with reference to Fig. 1 of U. S. Patent No. 2,344,810 to Fredendall et al. and which is further shown in Fig. 5 of the article by Wendt and Fredendall appearing in the "Proceedings of the Institute of Radio Engineers" hereinbefore referred to, has been enclosed in a box by broken lines and the Fredendall et al. circuit itself is unenclosed.

Synchronizing pulses are impressed, as shown, onto the primary of a transformer and the utilized portion of these pulses is illustrated as curve *b* of Fig. 2 and the small letter *b* has been placed adjacent the primary of the transformer to indicate the utilized wave shape. In this figure, small reference characters will refer to the wave shapes appearing at particular portions of the circuits and these have been illustrated by the same refences characters as curves in Fig. 2.

The secondary of the transformer then is connected through two coupling condensers $C_1$ and $C_2$ to the extremities of two serially connected resistors $R_1$ and $R_2$ whose common terminal is grounded through an appropriate biasing source. One end terminal of resistor $R_1$ is connected to the cathode of a diode rectifier $T_1$ whose plate is connected to the cathode of a diode rectifier $T_2$ and to the common terminal of resistors $R_1$ and $R_2$. The plate of $T_2$ is connected to the other end terminal of resistor $R_2$. Shunted across the diode rectifiers are a pair of serially connected resistors $R_3$ and $R_4$ whose common terminal is connected directly to the grid of a direct current amplifying tube $T_3$.

The plate of $T_3$ is connected to a source of positive potential indicated by +B through serially connected resistors $R_5$ and $R_{24}$. The cathode of the tube is grounded. The plate of $T_3$ also is connected to resistors $R_8$ and $R_{17}$ and the purpose of this connection will be explained more fully hereinafter.

The common terminal of resistors $R_5$ and $R_{24}$ is connected to the input of a filter circuit including resistor $R_6$ and condenser $C_{13}$ connected serially therewith and having condenser $C_3$ shunted across the series circuit. The common terminal of condensers $C_3$ and $C_{13}$ is grounded. The common terminal of condenser $C_3$ and resistor $R_6$ is connected to a resistor $R_7$ which, in turn, is serially connected with resistor $R_{18}$ and the grid of a blocking oscillator tube $T_4$, the latter being included in the scanning oscillator circuit. The common terminal of resistors $R_7$ and $R_{18}$ is connected to a resistor $R_{21}$ included in a filter circuit whose purpose will be explained more fully hereinafter.

The blocking oscillator including tube $T_4$ is a well known form of blocking oscillator and therefore will not be explained in detail here, it being considered sufficient to say that an inductive member in the plate-cathode circuit of the tube is magnetically coupled with an inductive member in the grid-cathode circuit of the tube, the latter being serially connected with a condenser $C_{10}$, and feed back from the plate circuit to the grid circuit is accomplished by means of the coupled inductances. The operation of the form of blocking oscillator is well known.

The potential variations of the grid of tube $T_4$ are impressed onto the grid of a discharge tube $T_5$, the latter having connected in the plate-cathode circuit thereof a charging resistor $R_{19}$ connected to a source of positive potential indicated by +B and having serially connected condensers $C_{11}$ and $C_{12}$ shunted thereacross. The tube $T_5$ acts as a discharge path for the charge stored in condensers $C_{11}$ and $C_{12}$ at intervals governed by the action of the blocking oscillator including tube $T_4$ since the potential of the grid and, hence, conducting state of $T_5$ is governed by $T_4$ and its associated circuits. The potential variations occurring in the plate circuit of tube $T_5$ (which have the well known sawtooth wave shape) then may be fed by appropriate coupling means, not shown, to the actual deflecting circuits of the kinescope with which the apparatus is associated.

A portion of the signal appearing in the plate circuit of tube $T_3$ is fed to a resistor $R_8$ and this signal is impressed onto a filter circuit including resistor $R_9$, the latter having shunt condensers $C_4$ and $C_5$ each connected to one terminal thereof and having their common or other end terminal grounded. The output of this filter is fed through coupling condenser $C_6$ and impressed onto resistor $R_{10}$, the latter being connected in the grid-cathode circuit of a tube $T_6$. In addition to its amplifying function, the tube $T_6$ acts as a polarity reversing tube in order that correct polarity relationships may be maintained.

The plate of tube $T_6$ is connected to a source of positive potential indicated by +B through plate resistance $R_{11}$, and the signal appearing in the plate circuit is passed through two coupling condensers $C_7$ and $C_{15}$ and impressed onto two resistors $R_{12}$ and $R_{16}$. Resistor $R_{12}$ is grounded at the terminal thereof remote from its terminal connected to condenser $C_7$ and the plate of tube $T_7$ shunted across this resistor is grounded. The cathode of tube $T_7$ is connected to the common terminal of condenser $C_7$ and resistor $R_{12}$. The plate of a diode rectifier $T_8$ is connected to the common terminal of condenser $C_{15}$ and resistor $R_{16}$ and the cathode thereof is grounded as is the uncommon terminal of resistor $R_{16}$. The signal developed by rectifier $T_7$ is passed through resistor $R_{13}$ and signals developed by rectifier $T_8$ are passed through resistor $R_{14}$. The two resistors are connected together so as to combine the signals from the two diode rectifiers.

The signals so combined are fed to a filter including resistor $R_{15}$, the latter having shunt condensers $C_8$ and $C_9$ connected to the terminals thereof and the common or other end terminal of each of the two condensers is grounded. The common terminal of resistor $R_{15}$ and condenser $C_9$ is connected through resistor $R_{22}$ to the common terminal of resistors $R_7$ and $R_{18}$.

The common terminal of resistor $R_7$ and resistor $R_{18}$ also is connected to the common terminal of resistors $R_{21}$ and $R_{22}$. The latter resistors are connected serially with resistor $R_{17}$ and the plate of tube $T_3$. The common terminal of resistors $R_{17}$ and $R_{21}$ is connected to ground through condenser $C_{16}$.

The operation of the circuit is as follows: Synchronizing pulses are applied with opposite polarities to the input circuits of tubes $T_1$ and $T_2$ by means of the transformer and these pulses normally are narrowed by differentiation of the pulses by the transformer. The sawtooth wave which is formed by storage and discharge of energy in condenser $C_{12}$ is fed back to the center tap of the secondary of the transformer. This wave will have the shape shown by section *a* of Fig. 2.

Since this sawtooth wave is combined with the synchronizing pulses, the wave shape appearing at the lower terminal of the transformer and connected to condenser $C_2$ will be that of the wave shown in section *c* of Fig. 2. The wave form appearing at the upper terminal of the transformer which is connected to condenser $C_1$ will be that as illustrated by curve *d* in Fig. 2. It will be assumed, for purposes of illustration, that the frequency of the blocking oscillator including tube $T_4$ is higher than that of the synchronizing pulses. Therefore, the phase relationship between the sawtooth waves and the input synchronizing signals continually changes as shown by wave *c* or wave *d* of Fig. 2. The wave developed by tubes $T_1$ and $T_2$, acting as peak detectors, then will be shown by curves *g* and *e* of Fig. 2 and the combined effect of these waves appearing at the grid of the direct current amplifying tube $T_3$ will be such as shown in curve *f* of Fig. 2. The voltage waves at points *e*, *f* and *g* actually contain considerable amounts of signal of the pulse frequency but since subsequent filters remove these components, the simplification of drawing waves *e*, *f* and *g* without these components is permissible. Inspection of curves *c* and *d* will show how and why the outputs of the peak detectors $T_1$ and $T_2$ will differ with changes in the phase relations between the synchronizing pulses and the sawtooth wave. Curve *f*, which is the result of combining waves *e* and *g*, represents the mean of the values of curves *e* and *g*.

The voltage appearing at the point *f* is amplified by tube $T_3$ and then smoothed by the low pass filter including $C_3$, $R_6$ and $C_{13}$. This wave supplies a bias to the tube $T_4$ and controls its frequency and will be variable if the output of the oscillator and the incoming synchronizing signals are not locked in in the proper phase relationship. In the circuit of Fredendall et al., this voltage alone will cause lock-in if the initial free-running frequency of the oscillator does not deviate too greatly from the frequency of the synchronizing pulses.

In the curves *a* and *b* of Fig. 2, a condition is illustrated in which the free-running frequency of the oscillator departs considerably from that of the synchronizing pulses and is higher in value. During the time $t_1$ (illustrated below curve *k* of Fig. 2), the control voltage appearing at the plate of tube $T_3$ is becoming more negative since the action of tube $T_3$ will have reversed the polarity of the wave *f*. This tends to slow the oscillator down and cause lock-in, but, if the deviation between the oscillator frequency and the synchronizing signal frequency be very great, a very large control voltage will be required to provide a great change in its frequency.

Again, the fundamental frequency of the control wave *f*, which is the difference between the frequencies of the oscillator and that of the synchronizing pulses, may be great enough so that the filter circuit including $C_3$ and $C_{13}$ will reduce the amplitude of the control wave. Further, the wave *f* itself being variable in nature will, at one portion, tend to slow down the oscillator and, at another portion thereof, tend to speed it up.

The amplification of the control circuit of the Fredendall et al. showing can be made great enough to swing the oscillator but this tends to increase the effects of noise and spurious signals in a manner which is objectionable. All of these factors tend to mitigate against a quick positive lock-in between the oscillator and the synchronizing signals and the present invention relates to an apparatus in which these disadvantages are overcome.

It is the purpose of my invention to generate an auxiliary slow-changing D. C. voltage from wave $f$ which will operate to gradually change the oscillator frequency toward synchronization even while the oscillator is drifting rapidly. To accomplish this result a portion of the curve $f$, which is amplified by tube $T_3$, is impressed onto a second filter including resistors $R_8$ and $R_9$ and condensers $C_4$ and $C_5$. Resistor $R_8$ and condenser $C_4$ and resistor $R_9$ and condenser $C_5$ remove only the very high frequency components, that is, the components of deflection frequency and above, which will be present to some degree in the waveform $f$, although, for purposes of simplicity of illustration, they have not been shown in the curves $e$, $f$ and $g$. This waveform then is differentiated by the capacity $C_6$ and resistor $R_{10}$. The result, then, is that there is impressed onto the grid of tube $T_6$, and hence will appear in the output circuit thereof, a waveform having the general shape of curve $h$ of Fig. 2. This waveform has a peak during the time $t_1$, as illustrated, and the polarity of this peak reverses as the oscillator begins to run too slowly instead of too fast. Its amplitude is substantially proportional to the difference between the oscillator frequency and the synchronizing signal frequency.

When the peaks of curve $h$ are positive, as illustrated, the peak detector including diode $T_8$ with its associated condenser $C_{15}$ and resistor $R_{16}$ will produce a wave at point $j$ which contains a negative D. C. voltage as illustrated in curve $j$. For this condition, the D. C. component of the voltage at point $i$ is substantially zero. Similarly, when the peaks are negative, the peak detector including tube $T_7$ and condenser $C_7$ and resistor $R_{12}$ will produce a positive D. C. voltage, as illustrated in curve $i$, which is proportional to the peaks of wave $h$. The voltage which appears at the common terminal of resistor $R_{13}$ and resistor $R_{14}$ is therefore positive or negative depending upon whether the blocking oscillator is operating too slow or too fast. This voltage is filtered by the filter including condensers $C_8$ and $C_9$ and resistor $R_{15}$ to remove the A. C. components arising from the individual pulses in wave $h$. In the interest of clarity, these A. C. components are omitted in the waves $i$ and $j$ of Fig. 2. The time constants of the filters used in this additional circuit, in accordance with my invention, are much longer than those required for the low pass filter which includes condenser $C_3$ and which removes the original individual synchronizing pulses which would pass what has been identified as channel #1 in the drawing. The voltage output of the filter including $C_8$, $C_9$, and $R_{15}$ is combined through resistor $R_{22}$ to that obtained from the filter including condenser $C_3$ and the effect is to give the control voltage illustrated by the curve $k$. The D. C. component shown by the displacement of curve $k$ from the zero reference line is due to the auxiliary voltage provided by the additional circuits of my invention and give a larger component of control for the blocking oscillator including tube $T_4$.

The preferable arrangement is that illustrated in Fig. 1 wherein two peak rectifiers, such as tubes $T_7$ and $T_8$ with their associated circuits, are used. However, one tube and its associated circuit, such as $T_8$, $C_{15}$, $R_{16}$, and $R_{14}$, could be omitted and good performance could still be obtained if care is taken to always have the initial free-running frequency of the oscillator above that of the synchronizing pulses so that the remaining tube $T_7$ can produce the necessary control voltage.

Similarly, rather than taking the signal directly from the plate of tube $T_3$ for impression onto resistor $R_8$, the signal could be taken after it had passed through the filter including resistor $R_6$ and condensers $C_3$ and $C_{13}$ and, under these circumstances, the signal could be fed directly to the differentiating condenser $C_6$. However, the arrangement as illustrated allows a greater choice of the filter parameters and, consequently, a greater flexibility in the operation of the apparatus, since, in the arrangement shown, the constants of these two filter circuits may be made different from each other.

After lock-in between the blocking oscillator and the received synchronizing signals has been obtained, the voltage at the point $h$ in the output circuit of tube $T_6$ becomes a fixed D. C. value so that the peak detectors $T_7$ and $T_8$ provide zero voltage at point $i$ and point $j$. Under this condition, the channel identified as channel #2 provides no voltage and the voltage from channel #1 may be inadequate to hold the oscillating speed of the blocking oscillator at its desired fixed value and lock-in would be lost. To prevent this condition occurring, there is provided a third control channel through the filter containing resistors $R_{17}$, $R_{21}$ and condenser $C_{16}$. The voltage supplied by this channel is somewhat similar in wave shape to that supplied by the first channel but is greater in amplitude and contains less high frequency components in its output because of greater filtering action obtained therefrom. It is, therefore, relatively free from noise but is sluggish in character and does not help much to obtain the initial lock-in. It does, however, provide a useful, generous bias after lock-in has been obtained by the help of the second control channel voltage through resistor $R_{22}$, and the time constants of the filters of the second and third channels are substantially of the same order in value so that it may be said that, after lock-in has occurred, channel #3 supplants channel #2 in the furnishing of a bias to tube $T_4$. However, channel #3 is not an essential part of my invention but may be considered as a refinement.

Having thus described the invention, what is claimed and desired to be secured by Letters Patent is the following:

What I claim is:

1. In combination with synchronizing apparatus, said synchronizing apparatus comprising a first source of signals, a second source of signals of predetermined frequency, mean to compare the phase of the signals from said first source with that of the signals of predetermined frequency, means to develop a first control signal representative of the phase comparison of said signals; additional electrical means to develop a second control signal representative of the mean value of the maximum rate of change of said first control signal, and means for affecting the frequency of the signals from said first source of signals under the influence of both of said control signals.

2. Apparatus in accordance with claim 1 wherein there is provided, in addition, means for filtering the first control signal representative of the phase comparison between said signals.

3. Apparatus in accordance with claim 1 wherein there is provided, in addition, means for filtering the second control signal representative of the mean value of the maximum rate of change of said first control signal.

4. In combination with synchronizing apparatus, said synchronizing apparatus comprising an oscillator, a source of signals of predetermined frequency, means to compare the phase of the output waves from said oscillator with that of the signal source and to develop a first control signal representative of the phase comparison; additional means for differentiating and rectifying at least a portion of the first control signal developed from the phase comparison of the output waves of the oscillator with those of the signal source, and means for affecting the frequency of the oscillator under the influence of the first control signal and the output of the rectifying means.

5. Apparatus in accordance with claim 4 wherein the additional means for rectifying at least a portion of the first control signal developed from the phase comparison of the output waves of the oscillator and the signal source comprises a pair of rectifying means, means for impressing onto said rectifying means at least a portion of the first control signal in polarity opposition, and means for combining the outputs of said rectifiers to develop a single additional control signal.

6. In synchronizing apparatus for maintaining the phase of signals from a first source of signals in a predetermined relationship with the phase of the signals from a second source of signals, rectifying means, means for impressing signals from the first source of signals and the second source of signals onto said rectifying means to compare the phase of the signals from both sources and to develop a control signal representative of the phase relationship between said signals, means to affect the frequency of the signal output from said first signal source under the influence of at least a portion of said first control signal, means for differentiating and rectifying at least a portion of said first control signal to provide a second control signal, and means for affecting the output frequency of said first signal source under the influence of said second control signal.

7. In synchronizing apparatus, an oscillator, a source of synchronizing signals, a plurality of rectifiers, means for impressing at least a portion of the output wave from said oscillator onto said rectifiers in a predetermined polarity relationship, means for impressing said synchronizing signals onto said rectifiers in a predetermined polarity relationship, means for deriving a first control signal from said rectifiers in accordance with the phase relationship between the output waves of said oscillator and the synchronizing signals, means for differentiating and rectifying at least a portion of the output waves from said rectifiers to provide a second control signal, and means for affecting the output frequency of said oscillator under the influence of both of said control signals.

8. Apparatus in accordance with claim 7 wherein the means for rectifying at least a portion of the output signals from the plurality of rectifiers comprises a pair of rectifying means, means for impressing signals representative of a portion of the output signals from the plurality of rectifiers onto said pair of rectifiers in an opposing polarity relationship, and means for combining the outputs of said pair of rectifiers.

9. In synchronizing apparatus, an oscillator for producing alternating current signals, a source of synchronizing signals, means for producing a first control signal in accordance with the phase of the signal of said oscillator with respect to the synchronizing signals, means for applying said first control signal to said oscillator to control its frequency, means for differentiating a portion of said control signal to produce a modified signal having peaks in accordance with the rate of change of said phase, rectifying means responsive to said peaks to produce a second control signal, and means for applying said second control signal to said oscillator to control its frequency.

10. Apparatus in accordance with claim 9 wherein there is provided in addition means for filtering said first control signal to produce a third control signal having substantially only the low-frequency components of said first control signal, and means for applying said third control signal to said oscillator to control its frequency.

11. In synchronizing apparatus, an oscillator, a source of synchronizing signals, a plurality of rectifiers, means for impressing representations of the output of said oscillator onto said rectifiers in a predetermined polarity relationship, means for impressing said synchronizing signals onto said rectifiers in a predetermined polarity relationship whereby there is produced in the output circuit of the said rectifiers a signal representative of the phase relationship between said synchronizing signal and the oscillator output signals, means for combining the outputs of said rectifiers, filter means, means for impressing at least a portion of the combined output of said rectifiers onto said filter means, means for impressing at least a portion of the output of said filter means onto said oscillator to affect the frequency output thereof, a pair of rectifying means, wave differentiating means, means for impressing at least a portion of the combined output of said plurality of rectifiers onto the differentiating means, means connecting the output of the differentiating means to the pair of rectifiers in a predetermined polarity relationship, means for combining the outputs of said pair of rectifiers, and means for impressing the combined outputs of said pair of rectifiers onto said oscillator to affect the output frequency thereof.

12. Apparatus in accordance with claim 11 wherein there is provided, in addition, a filter means interposed between the plurality of rectifiers and the pair of rectifiers, and means for impressing at least a portion of the combined output of said plurality of rectifiers onto said filter means.

13. In synchronizing apparatus, a first source of signals, a second source of signals of predetermined frequency, means for comparing the phase relationships of both of said sets of signals to derive a set of signals representative of said phase relationship, a first filter means, means for impressing at least a portion of said derived signals onto said filter means, means for utilizing the output of said filter means to affect the frequency of said first source of signals, a second filter means, means for impressing at least a portion of the derived signals onto said second filter means, and means for utilizing the output of said second filter means to affect the frequency of said first signal source.

14. Apparatus in accordance with claim 13 wherein there is provided, in addition, means for differentiating and rectifying at least a portion of the derived signals, and means for utilizing the output of said latter rectifying means to affect the frequency output of said first source of signals.

15. Apparatus in accordance with claim 14 wherein there is provided, in addition, a third filter means interposed between the source of derived signals and the means for rectifying at least a portion of the derived signals wherein said derived signals are impressed onto the input of said third filter and wherein the output of said third filter is impressed onto the means for rectifying the derived signals.

16. Apparatus in accordance with claim 15 wherein said second filter and said third filter have substantially the same time constant value.

17. In synchronizing apparatus, a blocking oscillator, a source of synchronizing signals, a first pair of rectifiers, a sawtooth oscillator having an electric storage element discharged at predetermined intervals by said blocking oscillator, means for impressing at least a portion of the potential variations of said storage element onto said pair of rectifiers in a like polarity, means for impressing synchronizing signals onto said pair of rectifiers in an opposing polarity, means for combining the outputs of said pair of rectifiers, filter means, means for impressing the combined outputs of said pair of rectifiers onto said filter means, means for impressing the output of said filter means onto said blocking oscillator to affect the frequency output thereof, a second filter means, means for impressing at least a portion of the output of said pair of rectifiers onto the input of said second filter means, a differentiating circuit connected to the output of said second filter means, a second pair of rectifiers connected to the output of said differentiating circuit, means for impressing at least a portion of the output of said second filter means onto said second pair of rectifiers in an opposing polarity relationship, means for combining the outputs of said second pair of rectifiers, and means for impressing the combined outputs of said second pair of rectifiers onto said blocking oscillator to affect the frequency output thereof.

18. Apparatus in accordance with claim 17 wherein there is provided, in addition, a third filter means interposed between the combined output circuits of said second pair of rectifiers and the blocking oscillator.

ALDA V. BEDFORD.

REFERENCES CITED

The following references are of record in the file of this patent:

UNITED STATES PATENTS

| Number | Name | Date |
|---|---|---|
| 2,250,284 | Wendt | July 22, 1941 |
| 2,258,151 | Shenk | Oct. 8, 1941 |
| 2,344,810 | Fredendall | Mar. 21, 1944 |
| 2,350,536 | Schlesinger | June 6, 1944 |
| 2,358,545 | Wendt | Sept. 19, 1944 |
| 2,399,421 | Artzt | Apr. 30, 1946 |